United States Patent
Lehmann et al.

(10) Patent No.: US 9,580,348 B2
(45) Date of Patent: Feb. 28, 2017

(54) METHOD FOR PRODUCING SYNTHETIC QUARTZ GLASS GRANULES

(71) Applicant: Heraeus Quarzglas GmbH & Co. KG, Hanau (DE)

(72) Inventors: Walter Lehmann, Leipzig (DE); Achim Hofmann, Frankfurt am Main (DE); Thomas Kayser, Leipzig (DE); Martin Arndt, Newcastle (GB)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 39 days.

(21) Appl. No.: 14/398,124

(22) PCT Filed: Apr. 17, 2013

(86) PCT No.: PCT/EP2013/057957
§ 371 (c)(1),
(2) Date: Oct. 30, 2014

(87) PCT Pub. No.: WO2013/164189
PCT Pub. Date: Nov. 7, 2013

(65) Prior Publication Data
US 2015/0107301 A1    Apr. 23, 2015

(30) Foreign Application Priority Data

Apr. 30, 2012 (DE) .......... 10 2012 008 437

(51) Int. Cl.
*C03B 20/00* (2006.01)
*C04B 35/185* (2006.01)
(Continued)

(52) U.S. Cl.
CPC .......... *C03B 20/00* (2013.01); *C03B 19/1095* (2013.01); *C04B 35/185* (2013.01);
(Continued)

(58) Field of Classification Search
CPC . C04B 35/185; C04B 35/62665; C04B 35/64; C23C 4/10; C23C 4/11; C23C 4/18;
(Continued)

(56) References Cited

U.S. PATENT DOCUMENTS 3,758,318 A * 9/1973 Farris .................... C04B 35/185
501/128
4,225,332 A    9/1980 Tsay
(Continued)

FOREIGN PATENT DOCUMENTS

DE    10 2004 038 602 B3    8/1981
DE       30 01 371 A1       8/1981
(Continued)

OTHER PUBLICATIONS

Espacenet English language abstract of DE 102004038602 B3, published Aug. 6, 1981.
(Continued)

*Primary Examiner* — Queenie Dehghan
(74) *Attorney, Agent, or Firm* — Tiajoloff & Kelly LLP

(57) ABSTRACT

The production of a quartz glass grit comprises the granulation of pyrogenetically produced silicic acid, and the formation of a $SiO_2$ granulate and the vitrification of the $SiO_2$ granulate using a treatment gas, which contains at least 30% by volume of helium and/or hydrogen. Said process is time consuming and cost intensive. In order to provide a method which makes it possible, starting from a porous $SiO_2$ granulate, to manufacture, in a cost effective manner, a dense, synthetic quartz glass grit, which is suitable for melting bubble-free components made of quartz glass, according to the invention the vitrification of the $SiO_2$ granulate occurs in a rotary kiln having a mullite-containing ceramic rotary kiln, for the manufacture of which a starting powder, which contains a molar proportion of at least 45%

(Continued)

Figure 1:
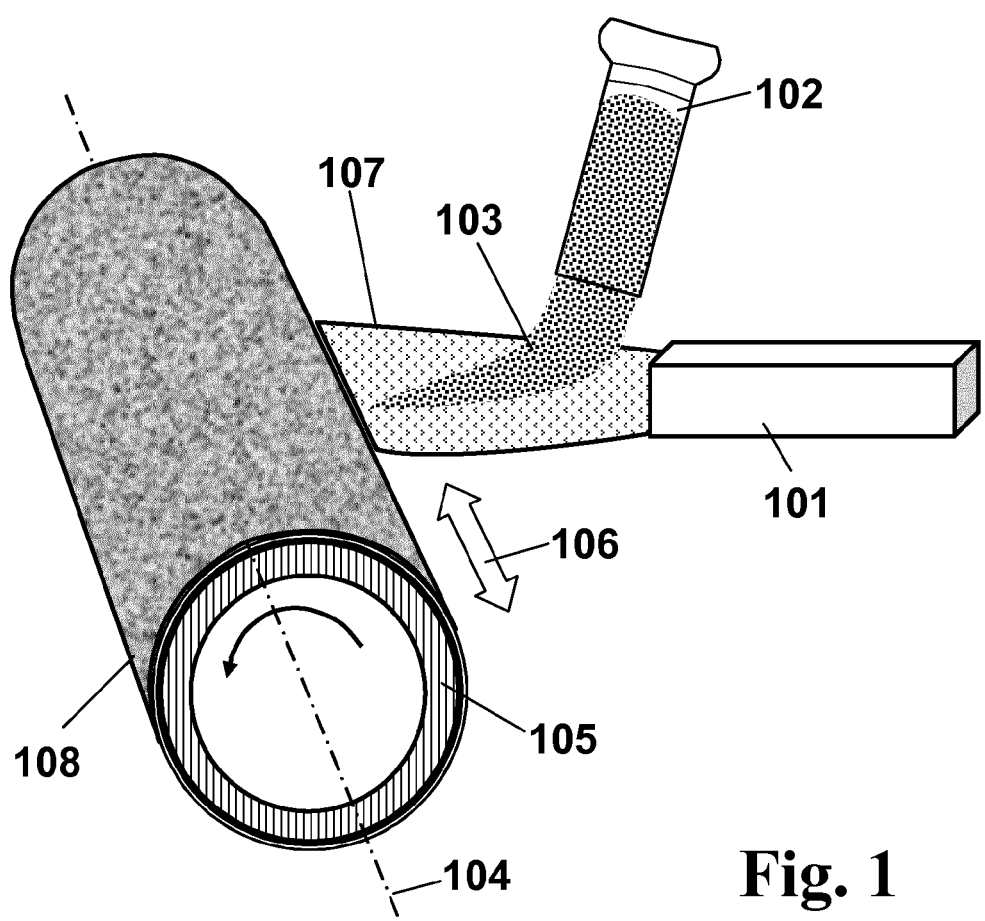

SiO$_2$ and Al$_2$O$_3$ is applied by means of a thermal powder spraying method, forming a mullite-containing layer on a mold core, and the mold core is subsequently removed, and wherein the ceramic rotary kiln is flooded with a treatment gas or rinsed with a treatment gas, and wherein the ceramic rotary kiln is flooded with a treatment gas or rinsed with a treatment gas, which contains at least 30% by volume of helium and/or hydrogen.

22 Claims, 2 Drawing Sheets

(51) Int. Cl.
| | |
|---|---|
| *C03B 19/10* | (2006.01) |
| *C23C 4/10* | (2016.01) |
| *C23C 4/18* | (2006.01) |
| *F27B 7/00* | (2006.01) |
| *F27B 7/04* | (2006.01) |
| *F27B 7/34* | (2006.01) |
| *C04B 35/626* | (2006.01) |
| *C04B 35/64* | (2006.01) |

(52) U.S. Cl.
CPC ........ *C04B 35/62665* (2013.01); *C04B 35/64* (2013.01); *C23C 4/10* (2013.01); *C23C 4/11* (2016.01); *C23C 4/18* (2013.01); *C23C 4/185* (2013.01); *F27B 7/00* (2013.01); *F27B 7/04* (2013.01); *F27B 7/34* (2013.01); *C03B 2201/02* (2013.01); *C04B 2235/5427* (2013.01); *C04B 2235/77* (2013.01); *C04B 2235/94* (2013.01)

(58) Field of Classification Search
CPC .... C23C 4/185; F27B 7/00; F27B 7/04; F27B 7/34
See application file for complete search history.

(56) References Cited

U.S. PATENT DOCUMENTS

| | | | |
|---|---|---|---|
| 4,225,443 A | | 9/1980 | Harris et al. |
| 4,460,529 A | | 7/1984 | Schultze et al. |
| 4,547,415 A | | 10/1985 | Schultze et al. |
| 5,261,943 A | * | 11/1993 | Friedrichs ................. C22B 5/12 |
| | | | 266/173 |
| 5,637,284 A | * | 6/1997 | Sato ........................ C03C 1/022 |
| | | | 106/482 |
| 6,360,563 B1 | | 3/2002 | Gerhardt et al. |
| 6,849,242 B1 | | 2/2005 | Koeppler et al. |
| 2013/0219963 A1 | * | 8/2013 | Lehmann ............ C03B 19/1005 |
| | | | 65/17.4 |

FOREIGN PATENT DOCUMENTS

| | | |
|---|---|---|
| EP | 1 076 043 A2 | 2/2001 |
| EP | 1 088 789 A2 | 4/2001 |
| JP | H10287416 A | 10/1998 |
| WO | 88 03914 A1 | 6/1988 |

OTHER PUBLICATIONS

Espacenet English language abstract of EP 1076043 A2, published Feb. 14, 2001.
Espacenet English language abstract of JP H10 287416 A, published Oct. 27, 1998.

* cited by examiner

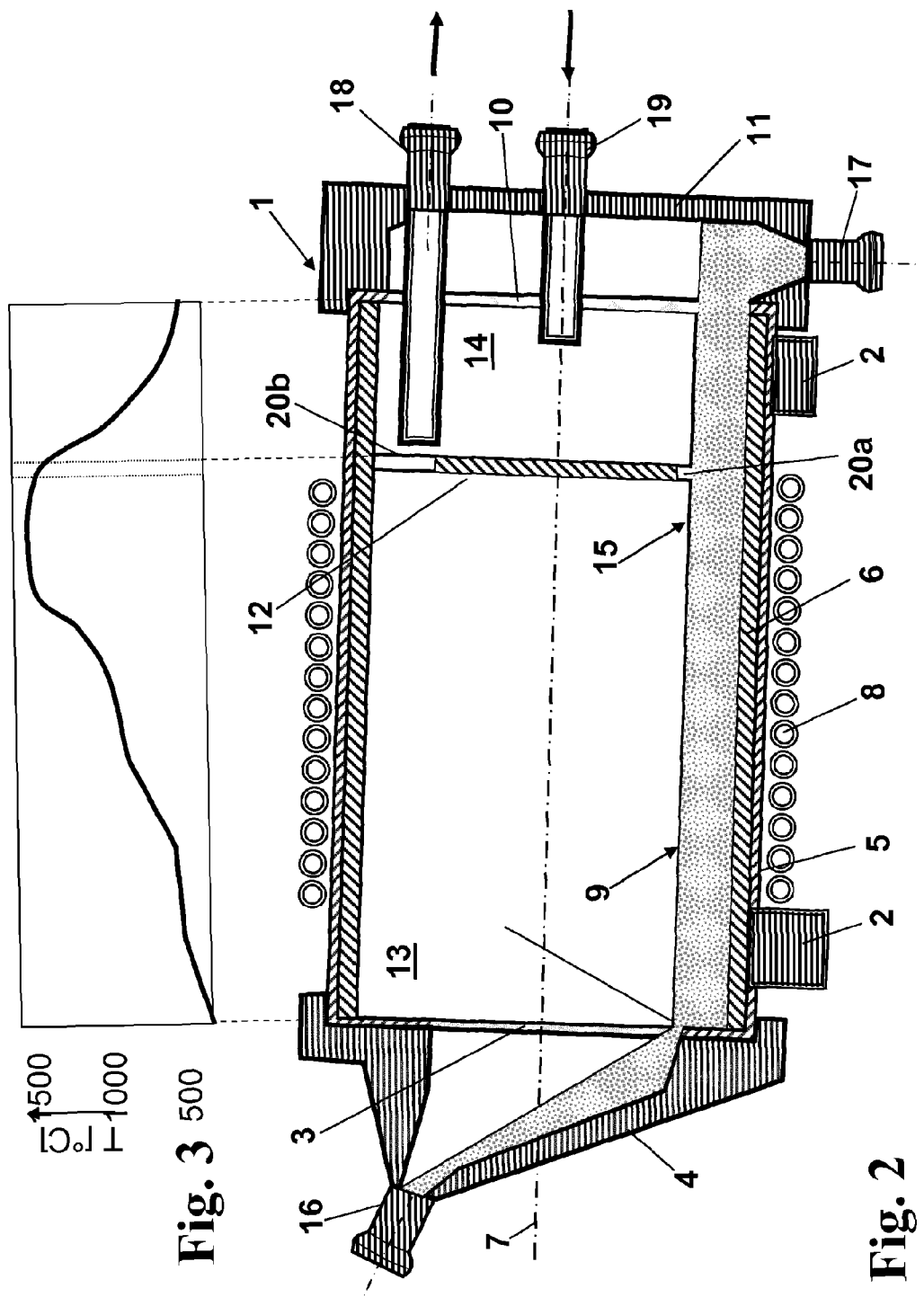

METHOD FOR PRODUCING SYNTHETIC QUARTZ GLASS GRANULES

TECHNICAL FIELD

The present invention relates to a method for producing synthetic quartz glass granules by vitrifying a free-flowing $SiO_2$ granulate which is obtained by granulation of pyrogenically produced silicic acid.

Synthetically produced dense quartz glass granules can be used for producing quartz glass components, such as crucibles, tubes, holders, bells, reactors for semiconductor or lamp manufacture and for chemical process engineering. Apart from purity and chemical resistance, a high temperature stability plays a decisive role in such manufacturing processes. Temperature values of about 1150° C. are indicated as the lower softening point for pure quartz glass in the literature. The necessary process temperatures, however, are often higher, which may result in plastic deformations of the quartz glass components.

PRIOR ART

The porous $SiO_2$ granulate consists of granulate particles which are obtained as agglomerates of $SiO_2$ particles, as occur e.g. during production of synthetic quartz glass by polymerization, polycondensation, precipitation or CVD methods. On account of their low bulk density the direct fusion of such $SiO_2$ particles poses problems, so that they are usually first pre-densified by granulation. Roll granulation, spray granulation, centrifugal atomization, fluidized bed granulation, granulating methods using a granulating mill, compaction, roller presses, briquetting, flake production or extrusion should be mentioned as examples.

The discrete, mechanically and possibly also thermally pre-densified particles which are obtained thereby are thus composed of a multitude of primary particles and are here called "$SiO_2$ granulate particles". In their entirety, they form the porous "$SiO_2$ granulate".

The fundamental problem arises that porous $SiO_2$ granulate should be densified without any bubbles, if possible. The reason is that during fusion of the "$SiO_2$ granulate" into quartz glass the risk arises that closed, gas-filled cavities are formed which cannot be removed or can be removed only at a very slow pace from the highly viscous quartz glass mass and which thereby lead to bubbles in the quartz glass. Therefore, dense vitrified quartz glass particles must normally be produced for sophisticated applications. The prior art is aware of many different techniques for achieving this goal.

EP 1 076 043, for instance, suggests that porous $SiO_2$ granulate should be trickled into a burner flame to finely disperse the same therein and to vitrify it at temperatures of 2000-2500° C. The granulate is preferably obtained by spray or wet granulation of filter dust and has grain sizes in the range of 5 μm to 300 μm. Prior to vitrification it can be heated by treatment with microwave radiation and can be pre-densified.

The degree of sintering of a given granulate particle depends on its particle size and on the heat input which, in turn, is determined by the residence time in the burner flame and the flame temperature. As a rule, however, the granulate shows a certain particle size distribution, and the combustion gas flame has regions of different flow velocities and flame temperatures. This leads to irregular and hardly reproducible sintering degrees. Moreover, there is the risk that the quartz glass particles are contaminated by the combustion gases. Loading with hydroxyl groups upon use of hydrogen-containing combustion gases should here particularly be mentioned, which is accompanied by a comparatively low viscosity of the quartz glass.

EP 1 088 789 A2 suggests for the vitrification of porous $SiO_2$ granulate that synthetically produced granulate should first be cleaned by heating in HCl-containing atmosphere in a rotary kiln, that it should subsequently be calcined in a fluidized bed and then vitrified in a vertical fluidized-bed apparatus or in a crucible under vacuum or helium or hydrogen to obtain synthetic quartz-glass granules.

This represents a discontinuous vitrification process accompanied by great thermal inertia of the kiln and thus long process periods with correspondingly great efforts in terms of time and costs with a low throughput and with a granulate that is relatively expensive on the whole.

In a similar method according to JP 10287416A, particulate $SiO_2$ gel with diameters in the range between 10 μm and 1,000 μm is continuously densified in a rotary kiln. This kiln comprises a rotary tube of quartz glass having a length of 2 m and an inner diameter of 200 mm. The rotary tube is heated by means of heaters from the outside and is divided into plural temperature zones that cover the temperature range of 50° C. to 1,100° C. The particulate $SiO_2$ gel with particles sizes between 100 μm and 500 μm is freed of organic constituents in the rotary tube, which is rotating at 8 rpm, by supply of an oxygen-containing gas and is sintered to form $SiO_2$ powder. The kiln atmosphere during sintering contains oxygen and, optionally, argon, nitrogen or helium.

The $SiO_2$ powder obtained thereafter contains, however, also silanol groups in a high concentration of not less than 1,000 wt. ppm. For the elimination thereof the $SiO_2$ powder is subsequently calcined and dense-sintered at an elevated temperature of 1,300° C. in a quartz glass crucible with an inner diameter of 550 mm in batches of 130 kg.

The thermal stability of a rotary tube of quartz glass limits the use thereof at a high temperature for the vitrification of the granulate particles. During vitrification in the quartz glass crucible, however, there may occur a caking of the sintering granulate particles, resulting in an undefined pore-containing quartz glass mass.

WO 88/03914 A1 also teaches the reduction of the BET surface area of an amorphous porous $SiO_2$ powder using a rotary kiln in a helium- and/or hydrogen-containing atmosphere. In a first procedure fine $SiO_2$ soot dust is put into a rotary kiln, heated in air to 1200° C. and kept at this temperature for 1 h. The result of this process should be a free-flowing, spherical granulate with grain sizes of 0.1 mm to 5 mm, and a BET surface area of <1 $m^2/g$ is mentioned. Soot dust is however not free-flowing, it is extremely sinter-active, and it can be easily blown away. The processing of soot dust in a rotary kiln is therefore extremely difficult. In a modification of this procedure, it is suggested that $SiO_2$ soot dust should be mixed with water, resulting in a moist crumb-like mass. This mass is put into a rotary kiln and densified at a temperature of 600° C. into a powder having grain sizes of 0.1 mm to 3 mm. The $SiO_2$ powder that has been pre-densified in this way is subsequently vitrified in a separate kiln.

DE 10 2004 038 602 B3 discloses a method for producing electrically melted synthetic quartz glass for use in the manufacture of lamps and semiconductors. Thermally densified $SiO_2$ granulate is used as the starting material for the electrically melted quartz glass. The granulate is formed by granulating an aqueous suspension consisting of amorphous, nanoscale and pyrogenic $SiO_2$ particles produced by flame hydrolysis of $SiCl_4$.

For increasing the viscosity the $SiO_2$ granulate is doped with $Al_2O_3$ by adding nanoparticles of pyrogenically produced $Al_2O_3$ or a soluble aluminum salt to the suspension.

This yields round granulate grains having outer diameters in the range between 160 µm and 1000 µm. The granulate is dried at about 400° C. in the rotary kiln and densified at a temperature of about 1420° C. up to a BET surface area of about 3 $m^2/g$.

For complete vitrification the individual grains of the granulate are then completely vitrified in different atmospheres, such as helium, hydrogen or vacuum. The heating profile during vitrification of the granulates comprises heating to 1400° C. at a heating rate of 5° C./min and a holding time of 120 min. After this treatment the individual granulate grains are vitrified in themselves. The grains are present in individual form without being melted into a mass.

The granulate is further processed in an electric melting process to obtain quartz glass; it is e.g. melted in a crucible to obtain a molded body, or it is continuously drawn into a strand in a crucible type drawing method.

Vitrification is here also carried out in a separate kiln, so that this is a discontinuous method with a plurality of cost-intensive heating processes.

U.S. Pat. No. 4,255,332 A describes the use of a rotary kiln for producing glass particles for filtering purposes. Finely ground glass powder with particle sizes of around 100 µm is mixed with water and binder and processed into granulate particles with particle sizes of about 300 µm to 4500 µm. These particles are sintered in a rotary kiln having a rotary tube of mullite into substantially spherical pellets with sizes of around 500-4000 µm. The temperature within the rotary tube is kept at about 670° C.

A rotary tube of mullite is here used for sintering glass powder granulates. The pure silicate mineral mullite ($3Al_2O_3 \cdot 2SiO_2$) cannot be densely sintered by means of conventional sintering techniques. Therefore, apart from mullite, the structure of technical mullite ceramic contains other mineral phases, particularly corundum ($Al_2O_3$) and glass ($SiO_2$). The properties of the mullite ceramic are variable by varying the chemical composition; to be more specific, the density of the sintered mullite ceramic depends substantially on the content of glass phase.

During the intended use a rotary tube of such mullite ceramic releases a multitude of impurities that are normally undesired in high-purity quartz-glass granules and are bad for many applications.

A reduction of the impurities by omitting the other mineral phases is not easily possible. The reason is that one of the special properties of the mullite ceramic is its inherently high temperature stability and thermal shock resistance up to about 1,200° C. The high-purity mullite mineral, however, is subject to phase conversion at about 1,100° C., the phase conversion being accompanied by a change in the thermal expansion coefficient and leading to the destruction of the structure.

The vitrification of $SiO_2$ granulate, however, requires temperatures that are above that temperature, namely in the range of the softening temperature of quartz glass, i.e. above 1,150° C. Therefore, standard rotary tubes of mullite ceramic are not very well suited for the vitrification of porous $SiO_2$ granulate, especially when the production of high-purity quartz glass granules is concerned. Moreover, in the rotary tube there is a tendency to adhesions to the inner wall of the rotary tube because of the roughness of the mullite ceramic.

TECHNICAL OBJECT

It is the object of the present invention to indicate a method which, starting from porous $SiO_2$ granulate, permits a continuous and inexpensive production of dense synthetic quartz-glass granules of high purity.

GENERAL DESCRIPTION OF THE INVENTION

This object, starting from a method of the above-mentioned type, is achieved according to the invention in that the $SiO_2$ granulate is vitrified in a rotary kiln comprising a mullite-containing ceramic rotary tube, for the manufacture of which a starting powder, which contains $SiO_2$ and $Al_2O_3$ with a molar fraction of at least 70%, is applied to a mold core by means of thermal powder spraying methods so as to form a mullite-containing layer, and the mold core is subsequently removed, and wherein the ceramic rotary tube is flooded with a treatment gas or flushed with the treatment gas which contains at least 30% by vol. of helium and/or hydrogen.

The $SiO_2$ granulate is obtained in that pyrogenically produced silicic acid—hereinafter also called "$SiO_2$ soot dust"—is pre-densified with the help of standard granulation methods. The granulating process can be performed by using a rotary tube, as is known from the prior art. The result is at any rate a porous $SiO_2$ granulate.

This granulate is vitrified in a rotary kiln with a heated rotary tube rotating about a central axis, which is slightly inclined in the longitudinal direction of the furnace so as to induce the transportation of the granulate from its inlet side to the outlet side. Special demands made on the rotary tube material are due to the high temperature and the accompanying material load. At least a part of the rotary tube wall consists of ceramic, mullite-containing material. This mixed ceramic has a higher softening temperature than undoped quartz glass.

It has been found that the manufacturing method for the rotary tube has an impact on the quality during the vitrification process. According to the invention a starting powder which contains $SiO_2$ and $Al_2O_3$ is processed by means of thermal powder spraying methods in that a layer is applied to a mold core. Due to the high temperature in the plasma zone the starting powders melt and form mullite-like structures during solidification with an amount of corundum and/or glass, depending on the composition of the starting powder. This powder is present as a powder mixture of pure $Al_2O_3$ and $SiO_2$ powder or as a mixed powder with a predetermined composition. The mullite amount in the structure of the mixed ceramic is as great as possible and should not be below 45% by vol., preferably 60% by vol. The mullite amount of $Al_2O_3$ which is at least 70% in the starting powder (based on the total molar fraction of the ceramic) is decisive for a sufficiently great amount of mullite in the structure. Especially in the case where pure powders are started from, the amount of undesired impurities must simply be minimized. Apart from $Al_2O_3$ and $SiO_2$, there are ideally no other components contained, specifically no alkalis and no earth alkalis.

The layer produced by thermal powder spraying methods may consist of a plurality of films deposited one upon the other. It is important that their inner wall is formed by direct contact of molten material with the mold core. The inner wall of the mullite-containing layer produced thereby represents the smooth surface of the mold core.

In the simplest case the mold core consists of a metal, and it is advantageously tubular so that it can be cooled from the inside. It easily detaches from the mullite-containing ceramic layer due to increased shrinkage during cooling. The rotary tube of mullite-containing ceramic for use in the method according to the invention is obtained from this layer, if necessary, after a minor mechanical aftertreatment of its outer wall.

Due to the manufacturing process the rotary tube obtained thereby is distinguished by high purity and density and by a smooth and dense inner wall. During the intended use the input of impurities into the granulate to be vitrified and the risk of adhesions to the inner wall of the rotary tube are thereby minimized.

The rotary tube consists of one or several parts. Viewed over the length of the rotary tube, a temperature profile is provided during vitrification with a temperature maximum that is higher than the softening temperature of quartz glass, i.e. above 1150° C. To make this possible without deformation of the rotary tube, at least the portion of the rotary tube that is thermally the most stressed one consists of the temperature-resistant mullite-containing ceramic. The rotary tube may have an inner lining consisting of the mullite-containing ceramic, and the mullite-containing ceramic may also form an outer shell of the rotary tube. Apart from a possible metallic enclosure, the rotary tube consists in the simplest case completely of the mullite-containing ceramic.

The granulate particles are heated in the rotary tube to a temperature that is sufficient for vitrification. The quartz glass particles obtained therefrom after vitrification have a specific surface area of less than 1 $cm^2/g$ (determined according to DIN ISO 9277—May 2003; "Bestimmung der spezifischen Oberfläche von Feststoffen durch Gasadsorption nach dem BET-Verfahren"). The surface is dense; the particles may here be transparent or partly opaque.

To enable the vitrification of the bulk material consisting of porous $SiO_2$ granulate in the rotary tube, another precondition is an atmosphere containing helium or hydrogen. Only an atmosphere containing enough helium or hydrogen permits a bubble-free or specifically low-bubble vitrification of the porous granulate particles at a low temperature and/or with short vitrification durations, as are possible under the conditions of rotary kiln vitrification. Possibly entrapped gases consist mainly (e.g. at least 90 vol. %) of helium and/or hydrogen. It is therefore intended according to the invention that during vitrification the rotary tube is either flooded with a treatment gas or that it is flushed with this treatment gas continuously or from time to time, wherein the treatment gas consists of at least 30 vol. % of helium and/or hydrogen and at the same time contains hardly any, or ideally no, nitrogen, for it has been found that granulate particles vitrified in the presence of nitrogen tend to have a higher bubble content.

When traveling through the rotary tube, the granulate particles are exposed to mechanical forces which are produced by the weight and the circulation of the bulk material. Possible agglomerates of the vitrified granules are here dissolved again.

Vitrification in the rotary kiln comprises one pass or plural passes. In the case of plural passes the temperature can be raised from pass to pass. In the case of plural passes a lower bubble content of the quartz glass granules can be achieved due to the longer treatment period. As a rule, the intensity of the thermal treatment defines the density of the vitrified granules. This intensity is defined by the integral of treatment temperature and treatment duration and the respective treatment atmosphere. The longer the treatment duration is at a high temperature and the greater the amount of helium and hydrogen is in the atmosphere, the denser will be the granules.

Depending on the intensity of the thermal treatment the quartz glass granules vitrified in this way are completely transparent and dense, or they still exhibit some opacity. Irrespective of this, the granules of a batch are however distinguished by a particularly high homogeneity in the sense that all quartz glass particles have about the same properties. This uniformity of the properties, e.g. degree of vitrification, distribution of dopants and hydroxyl groups within the particles, fictive temperature, or the like, is due to the fact that all particles are subjected to approximately the same treatment intensity due to the continuous circulation in the rotary tube.

The quartz glass granules can be further processed directly for the manufacture of quartz glass. Suitable methods are electric melting processes in which the quartz glass granules are fused as bulk material in a melting vessel into a viscous quartz glass mass and shaped into a molded body; flame melting methods in which the quartz glass granules are trickled into a combustion gas flame, melted therein and deposited on a carrier (Verneuil method). Moreover, the quartz glass granules are advantageously used for melting inner layers or outer layers of quartz glass crucibles.

It has turned out to be advantageous when the thermal powder spraying method used for producing the ceramic rotary tube is a plasma powder-spraying method.

The plasma powder-spraying method ensures a high melting temperature which guarantees a complete melting of the initial powder particles and a particularly dense and smooth inner wall of the deposited tubular layer. This manufacturing technique also permits the production of particularly thick-walled tubes with a large inner diameter. Details of this manufacturing method are explained in DE 30 01 371 C2, which is herewith incorporated with respect to suitable process parameters in the production of the tubular ceramic layer for the purpose of producing the rotary tube.

It has turned out to be useful when the starting powder for producing the ceramic rotary tube contains at least 75 mole % $Al_2O_3$, and when the contents of $SiO_2$ and $Al_2O_3$ together account for at least 95% by wt., preferably at least 98% by wt. of the mullite-containing ceramic rotary tube.

Undesired impurities are thereby avoided. A helpful factor is here that in the production of the mullite-containing ceramic by means of the above-explained plasma powder-spraying method, binders and other sintering aids can here completely be dispensed with.

In a particularly advantageous method modification it is thereby possible to use a rotary tube of a ceramic, mullite-containing material that has an alkali content of less than 0.5% by wt., preferably less than 0.1% by wt.

Already small amounts of alkalis in $SiO_2$ considerably increase the crystallization tendency of quartz glass. Therefore, an input of alkali or also of alkaline earth elements into the $SiO_2$ granulate or into the vitrified quartz glass granules across the rotary tube wall is not desired. The mullite-containing ceramic for the rotary tube is therefore ideally alkali-free.

Especially in this connection a modification of the method according to the invention is preferred in which at least part of the starting powder is synthetically produced.

Synthetically produced $SiO_2$ powders and $Al_2O_3$ powders suited for that purpose are commercially available. To minimize material costs, the synthetically produced material can be restricted to a thin inner lining of the rotary tube.

It has turned out to be useful when a rotary tube of a ceramic, mullite-containing material is used that has a density in the range of from 2.5 to 2.9 $g/cm^3$.

Due to abrasion of the inner wall of the rotary tube the surface is formed in the course of time by layers of the rotary tube wall that are increasingly deeper. The surface roughness of the inner wall can thereby vary. The higher the density of the mullite-containing ceramic is (this also means, the lower its porosity is), the lower will be the roughness of the surface as soon as this surface is formed by further internally located wall portions.

The above-explained plasma powder-spraying method yields a ceramic mullite-containing material of a high homogeneity, but a certain porosity, which is however homogeneously distributed axially and radially over the tube wall. To generate an increased density, a sintering process may follow. Densities in the above-mentioned range are an optimal compromise with respect to the manufacturing efforts and strength.

In this respect it has turned out to be advantageous when a rotary tube of a ceramic, mullite-containing material is used that has an open porosity of less than 10% by vol., preferably less than 5% by vol.

With respect to a particularly high density and low bubble content of the quartz glass granules a treatment gas has turned out to be useful during vitrification that contains at least 50% of helium and/or hydrogen, preferably at least 95%.

With such an atmosphere a complete vitrification of the porous granulate particles is possible at a comparatively low temperature and within a short period of time. With a high content of helium and/or hydrogen in the vitrification atmosphere of more than 50% by volume one also achieves a particularly high density and a low bubble content of the vitrified granules. The residual amount of the vitrification atmosphere can be formed by inert gases or by nitrogen and/or oxygen, wherein the volume fraction of the two last-mentioned gases is preferably less than 30% by volume.

The granulate particles are heated in the rotary tube to a temperature which effects vitrification. A temperature in the range of 1300° C. to 1600° C. has turned out to be useful.

At temperatures of less than 1300° C. a long treatment period is required for complete vitrification. Preferably, the temperature is at least 1450° C. At temperatures above 1600° C. rotary tube and kiln are excessively stressed thermally and undesired agglomerations of the quartz glass particles tend to occur. It is true that the mechanical load on the granulates by the rotation of the rotary tube reduces the risk of the formation of agglomerates. At high temperatures above about 1400° C., however, the quartz glass will soften partly, so that in regions with little movement there may be adhesions to the wall of the rotary tube.

To prevent such a situation, it is intended in a preferred procedure that the granulate particles are subjected to vibration.

Vibration can be produced by shaking or striking or by ultrasound. It is carried out regularly or in pulsed fashion from time to time.

The high vitrification temperature can be produced by burners acting on the granulate particles. Preferred is however a procedure in which heating is carried out by means of a resistance heater surrounding the rotary tube.

The heat input from the outside to the inside via the rotary tube wall requires an implementation of a temperature-stable ceramic, as has been explained above. This prevents a situation where the granulate particles are influenced mechanically (by blowing away) or chemically (by impurities) by a combustion gas.

A mullite-containing ceramic is used as the material for the inner wall of the rotary tube, so that an $Al_2O_3$ doping in the range of from 1 to 15 wt. ppm is generated by use of the mullite-containing rotary tube.

$Al_2O_3$ increases the viscosity of quartz glass. The material of the wall of the rotary tube thereby has the additional characteristic that it releases a dopant which contributes to an increase in the viscosity of quartz glass and thus to an improvement of the thermal stability of quartz glass components. The porous granulate particles which do not contain the dopant or contain it in an inadequate concentration are continuously heated in the rotary tube and thereby circulated. Owing to the contact with the inner wall containing the dopant, one achieves a finely divided abrasion that leads or contributes to a homogeneous doping of the granulate particles. An $Al_2O_3$ doping of the quartz glass granules in the range of 1-15 wt. ppm can thereby be produced.

The dopant is normally present as an oxide in the quartz glass. A core idea of this embodiment of the method according to the invention thereby consists in carrying out the complete vitrification of the porous $SiO_2$ granulate particles in a rotary kiln at a high temperature, which is made possible by a suitable atmosphere during vitrification and by a temperature-resistant material for the rotary tube, which simultaneously serves by way of abrasion as a dopant source for the quartz glass granules. This method permits a continuous vitrification of the $SiO_2$ granulate particles and at the same time the homogeneous loading with the viscosity enhancing dopant.

It is advantageous for an adequate input of $Al_2O_3$ as dopant of the quartz glass granules when the rotary tube consists completely of the mullite-containing ceramic.

The vitrification degree of the quartz glass particles depends on their size and thus on the size of the original size of the granulate particles. The method according to the invention yields particularly good results when the granulate particles have a mean grain size between 100 μm and 2000 μm, preferably between 200 μm and 400 μm.

Granulate particles with a mean grain size of more than 2000 μm can be vitrified only at a slow pace. Particularly fine-grained quartz glass granules tend to caking with the rotary tube wall.

To minimize said effect, it has turned out be useful to set a fines content of the $SiO_2$ granulate with particles sizes of less than 100 μm in advance in such a manner that it accounts for less than 10% by wt. of the total weight of the granulate.

For a vitrification of the granulate particles that is as uniform as possible, approximately identical particle sizes are advantageous. In this respect it has also turned out to be useful when the granulate particles have a narrow particle size distribution in which the particle diameter assigned to the $D_{90}$ value is at the most twice as large as the particle diameter assigned to the $D_{10}$ value. A narrow particle size distribution exhibits a comparatively low bulk density, which counteracts agglomeration during vitrification. Moreover, in the case of an ideally monomodal size distribution of the granulate particles, the weight difference between the particles is no longer applied as a parameter for a possible separation within the bulk material, which is conducive to a more uniform vitrification of the bulk material.

With respect to a reproducible and cost-effective production method the $SiO_2$ granulate is subjected prior to vitrification to a cleaning process by heating in a halogen-containing atmosphere, wherein the cleaning of the $SiO_2$ granulate is carried out in a second rotary kiln.

In this variant of the method, the thermal high-temperature treatment steps subsequent to granulate production, i.e. cleaning and vitrification, are each carried out in a rotary kiln. This achieves a substantially continuous production process, and a change of the kiln system is avoided. This facilitates timing as well as spatial adaptation in successive treatment steps and helps to shorten the cycle time of the granulate.

The rotary kilns are tailored to the specific requirements of the respective treatment step. A rotary kiln may here be subdivided into a plurality of treatment chambers kept separate from one another. To be more specific, in the case of a granulate that is already substantially dry, finish drying as well as cleaning can be carried out in one method step in a cleaning furnace. Ideally, however, a separate rotary kiln is provided for each of the treatment steps drying, cleaning and vitrifying. Treatment duration, temperature and atmosphere can thereby be optimally adapted to the respective process independently of each other, which results in a qualitatively better end product. As a result, e.g. during the transitions from drying to cleaning and from cleaning to vitrifying, it is e.g. possible to utilize the residual heat of the preceding process.

In the case of rotary tubes consisting of different materials, these may be butt-joined, but are preferably inserted into one another with a certain play to mitigate problems caused by different thermal expansion coefficients of the respective materials.

To be able to adjust the atmospheres in the different zones of the rotary kiln substantially independently of one another, neighboring zones of the rotary kiln are fluidically separated from one another to a certain degree and for this purpose they are preferably subdivided by separating screens provided with openings or by labyrinth traps.

The cleaning in the rotary kiln is carried out in a chlorine-containing atmosphere at a temperature in the range between 900° C. and 1250° C. The chlorine-containing atmosphere particularly achieves a reduction of alkali and iron contaminations from the SiO$_2$ granulate. At temperatures below 900° C. there will be long treatment durations, and at temperatures above 1250° C. there is the risk of dense-sintering the porous granulate with inclusion of chlorine or gaseous chlorine compounds.

In the sense of a substantially continuous procedure only one rotary kiln is used also for drying and cleaning the SiO$_2$ granulate, said kiln, viewed in the direction of the central axis, being subdivided into zones, comprising a drying zone and a cleaning zone.

The subdivision into zones is preferably carried out again by separating screens provided with openings or by labyrinth traps. In the area of the drying and cleaning zone, the inner wall of the rotary tube consists preferably of quartz glass so as to avoid contamination of the granulate.

If several process steps take place in a joint rotary kiln, such as drying/cleaning or cleaning/vitrification, each of the zones may be provided with its own heater. For good energy exploitation the rotary tubes for cleaning and vitrification are each heated by means of a resistance heater surrounding the rotary tube.

Drying of the granulate is carried out preferably by heating in air at a temperature in the range between 200° C. and 600° C.

In this procedure a separate drying furnace which is preferably designed as a rotary kiln is provided for drying the granulate. The temperature is constant or is increased as the drying process is progressing. At temperatures below 200° C. one obtains long drying durations. Above 600° C., entrapped gases may exit rapidly; this may lead to the destruction of the granulates.

The vitrified quartz glass particles can be used for producing components of opaque or transparent quartz glass, as e.g. tubes of opaque quartz glass which are produced in a centrifugal process. They can also be used per se as a particulate start material for producing a quartz glass cylinder in the so-called Verneuil process or for producing inner and outer layer of a quartz glass crucible. Moreover, they are processed by melting in electrically heated melting crucibles or melt molds into components, such as tubes, rods, holders, bells, reactors or crucibles for the semiconductor or lamp manufacture and chemical process engineering. Preferably, however, the quartz glass particles are used for producing a quartz glass crucible, particularly for producing the outer layer of the crucible. The viscosity-enhancing effect of the dopant of the quartz glass particles helps to prolong the service life of the quartz glass crucible.

Embodiment

The invention shall now be explained in more detail with reference to an embodiment and a drawing. In a schematic illustration FIG. 1 shows a system for producing a mullite tube for use in the method according to the invention by way of thermal powder spraying;

FIG. 2 shows a rotary kiln for performing the vitrification step in the method according to the invention, in a side view; and FIG. 3 shows a temperature profile over the length of the rotary kiln.

The system for thermal powder spraying as is schematically shown in FIG. 1 comprises a plasma burner 101, a reservoir with feed line 102 for a starting powder 103, and a metallic carrier tube 105 which is rotatable about its longitudinal axis 104 and has an outer diameter of 150 mm, a length of about 2 m and a smooth outer jacket surface. The plasma burner 101 and the starting-powder feed line 102 are reversingly movable along the longitudinal axis 104 of the carrier tube, as outlined by directional arrow 106.

The starting powder 103 is a synthetically produced mixed powder which is present in the mullite structure and consists of SiO$_2$ and of Al$_2$O$_3$, the latter with a molar fraction of 75%. The starting powder contains no binders or other additives. The mean particle size is 120 μm. The starting powder 103 is continuously supplied to the plasma flame 107 of the plasma burner 101 while the burner is reversingly moved in the direction of the longitudinal axis 104 along the carrier tube 105. The starting powder 103 is thereby melted in the plasma flame 107 and flung due to the plasma pressure against the outer jacket surface of the carrier tube 105 which is rotating about its longitudinal axis 104. During solidification a layer 108 is formed of a ceramic, mullite-like structure. A layer having a thickness of about 150 μm is produced per deposition pass. The deposition process is continued until the layer 108 has reached a thickness of 20 mm. After removal of the carrier tube 105 the mullite tube obtained thereby is subjected to a sintering treatment at a temperature of 1250° C. for the purpose of further densification.

The mullite tube obtained thereby by means of the thermal powder-spraying method is almost free of undesired impurities. Its open porosity is zero; the closed porosity is about 8%, the density is 2.8 g/cm$^3$, and its melting temperature is 1830° C. The mullite-containing rotary tube 6 (see FIG. 2) is obtained by slightly grinding the outer wall and sawing off the end caps for use in the method according to the invention.

Owing to the manufacturing process the rotary tube obtained thereby is distinguished by high purity and a smooth and dense inner wall. In the intended use the input of impurities into the granulate to be vitrified and the risk of adhesions to the inner wall of the rotary tube are thereby minimized.

FIG. 2 shows a rotary kiln 1 which is supported on rollers 2. The rotary kiln 1 substantially comprises a frame 5 of SiC in which a rotary tube 6 of mullite ceramic with an inner diameter of 150 mm and a length of 1.8 m is fixed. The rotary tube 6 is rotatable about a central axis 7 and heatable by means of a resistance heater 8 provided on the outer jacket.

The rotary kiln 1 is slightly inclined in longitudinal direction 7 relative to the horizontal to induce the transportation of a loose material consisting of porous $SiO_2$ granulate 9 from the inlet side 3 of the rotary kiln 1 to the removal side 10. The open inlet side 3 is closed by means of a rotatorily fixed inlet housing 4. The inlet housing 4 is equipped with an inlet 16 for the supply of porous $SiO_2$ granulate 9 and with a further inlet (not shown) for the supply of helium and other treatment gases, such as hydrogen.

The open removal side 10 of the rotary tube 6 is closed by means of an also rotatorily fixed removal housing 11. The removal housing 11 is provided with an outlet 17 for the removal of vitrified and post-treated quartz glass granules 15; gas can also flow via said outlet out of the rotary kiln 1. For the suction of helium-rich gas from the furnace atmosphere a suction nozzle 18 is provided that is arranged in the upper area of the rotary kiln 1. Furthermore, the removal housing 11 is equipped with a gas inlet nozzle 19 by means of which a helium-free gas, particularly argon, is introduced into the rotary tube 6.

With the help of a separating screen 12 the interior is subdivided into a preheating and vitrification zone 13 and into an aftertreatment zone 15. The separating screen 12 is designed such that it is permeable for the loose material of the granulate particles 9 and the vitrified quartz glass granules 15, respectively, but otherwise substantially separates the gas chambers. For this purpose it is fixed to the inner wall of the rotary tube 6 and is provided on its outer edge with two radially opposite openings 20a, 20b of the same size. Whenever the one opening 20a passes due to the rotation of the rotary tube 6 into the region of the loose material of the granulate 9 and the quartz glass granules 15, respectively, it lets them pass and is substantially clogged by the loose material at the same time so that only little gas can escape there from the vitrification zone 13 into the aftertreatment zone 14. At the same time the opposite opening 20b is in its uppermost position in the rotary kiln 1. The relatively lightweight helium gas preferably exits there and is sucked off by means of the suction nozzle 18 directly positioned there and is simultaneously replaced by argon via the gas inlet 19.

A substantial separation of the gas chambers of preheating/vitrification zone 13 and aftertreatment zone 14 is thereby possible. For an even more effective separation a plurality of separating screens 12 which are arranged one after the other and include openings offset in relation to one another in the manner of a labyrinth can be used, or separate rotary kilns are used for the vitrification of the granulate 9 and for the aftertreatment thereof. In the last-mentioned case the vitrified quartz glass granules which still have a temperature of at least 200° C. can be directly transferred into the rotary kiln for the aftertreatment.

The resistance heater 8 does not extend over the region of the aftertreatment zone 14; apart from the heat input by convection and heat conduction from the neighboring vitrification zone, this zone is unheated.

The method according to the invention will be described in more detail hereinafter with reference to embodiments:

Producing, Drying and Cleaning of $SiO_2$ Granulate

Example A

The granulate was produced by granulating a slurry with 60% by wt. of residual moisture from pyrogenic silicic acid (nanoscale $SiO_2$ powder, $SiO_2$ soot dust) and demineralized water in the intensive mixer. After granulation the residual moisture is <20%. The granulate was sieved to grain sizes of <3 mm.

The residual moisture was lowered to <1% by drying at 400° C. in a rotary kiln (throughput: 20 kg/h) in air. Subsequently, the fines fraction with grain sizes of <100 µm was removed. Sieving to the fraction 100-750 µm is carried out; this means that the fines fraction with grain sizes of <100 µm is removed. The grain size distribution is characterized by a D10 value of about 200 µm and a D90 value of about 400 µm.

Subsequently, cleaning and further drying in HCl-containing atmosphere is carried out in the rotary kiln at a maximum temperature of 1040° C. (throughput: 10 kg/h). The specific surface area (BET) is here reduced by about 50%.

This yielded a $SiO_2$ granulate of synthetic undoped quartz glass of high purity. It consists essentially of porous spherical particles with a particle size distribution having a D10 value of 200 µm, a D90 value of 400 µm, and a mean particle diameter (D50 value) of 300 µm.

Example B

The granulate was produced by high-speed granulation from pyrogenic silicic acid (nanoscale $SiO_2$ powder, $SiO_2$ dust) and demineralized water in the intensive mixer. For this purpose demineralized water is fed into the intensive mixer and pyrogenic silicic acid is added under mixing until the residual moisture is about 23% by wt. and a granulate is produced. The granulate is sieved to grain sizes of ≤2 mm.

The residual moisture is lowered to <1% by drying at 350° C. in a rotary kiln (throughput 15 kg/h) in air. The fines fraction with grain sizes <100 µm was removed; otherwise, no further sieving operation was carried out.

Subsequently, cleaning and further drying are carried out in HCl-containing atmosphere in the rotary kiln at temperatures of 1050-1150° C. (throughput: 10 kg/h).

The sum of chemical contaminants is reduced during hot chlorination to less than 1/10 of the starting material (i.e., to <10 ppm). The granulate consists essentially of porous particles having a particle size distribution with a D10 value of 300 µm, a D90 value of 450 µm and a mean particle diameter (D50 value) of 350 µm.

Vitrification of the Granulate

The rotary tube 6 which is rotating about its rotation axis 7 at a rotational speed of 8 rpm is continuously fed with undoped porous $SiO_2$ granulate 9 at a feed rate of 15 kg/h.

The rotary tube 6 is inclined in longitudinal direction 7 at the specific angle of repose of the granulate particles 9, so that a uniform thickness of the loose granulate is set over the length thereof. The uniform loose-material thickness facilitates the substantial separation of the interior of the rotary kiln into preheating and vitrification zone 13 and into the aftertreatment zone 14, respectively. The loose material shown in FIG. 2 in the inlet housing 4 shows a different angle of repose; this only serves a simplified schematic illustration.

The zone 13 of the rotary tube 3 is flooded with helium. The loose granulate is continuously circulated and heated in this process by means of the resistance heater 8 within the rotary tube 6 and gradually vitrified into quartz glass particles 15. The maximum temperature shortly before approximately the rear third of the rotary tube 6 is about 1460° C. The rotary tube 6 of mullite ceramic withstands said temperature without difficulty.

The loose material of the vitrified quartz glass particles 15 passes gradually into the aftertreatment zone 14 via the openings 20a; 20b of the separating screen 12. Due to the continuous introduction of argon via the gas inlet 19 and due to the approximately identical gas loss of helium-rich vitrification atmosphere, on the one hand by suction of the helium-rich gas exiting through the openings (20a; 20b) of the separating screen 12 by means of suction nozzle 18 and on the other hand by the gas loss via the removal nozzle 17, an atmosphere consisting of a mixture of helium with a considerable excess of argon is obtained in the aftertreatment zone 14; the helium content is less than 20% by vol. Since the aftertreatment zone 14 is not directly heated, the temperature continuously decreases from the separating screen 12 up to the outlet housing 11. At that place the mean surface temperature of the vitrified granules 15 is slightly more than 500° C. The mean residence time of the vitrified granules 15 in the aftertreatment zone 14 is about 40 minutes.

An axial temperature profile over the length of the rotary tube 6, which has so far been considered to be ideal, is schematically illustrated in the diagram of FIG. 3. The temperature T of the surface of the loose granulate 9 (determined by means of pyrometer) is plotted on the y-axis against the axial position in the rotary tube 6. Directly after having been supplied, the granulate 9 is dried at a temperature of about 500° C. for a duration of 30 min, and it is subsequently pre-densified thermally at a gradually rising temperature at about 1000° C. to 1300° C. The gas contained in the porous granulate 9 is here replaced by helium at the same time. This densification and gas-exchange process lasts for about 60 min. Subsequently, the loose granulate 9 is heated up for complete vitrification, thereby reaching a maximum temperature of about 1460° C. By that time the mean residence time in the rotary kiln 6 is about 3 h.

In this process stadium the helium content of the vitrified quartz glass particles 15 is relatively high. The gas volume of the theoretically releasable helium gas is 3 times the volume of the particles themselves (at a gas volume standardized to 25° C. and atmospheric pressure).

After passing through the separating screen 12 the vitrified and highly helium-loaded quartz glass particles 15 are gradually cooling down in the aftertreatment zone and are simultaneously substantially degasified due to the atmosphere having a rather low helium content; this means that helium is allowed to diffuse out of the dense quartz glass granules in that the temperature is kept sufficiently high—in the example more than 500° C.—and the outgassing duration sufficiently long—in the example more than 30 minutes. After completion of the aftertreatment the gas volume of helium to be released is at any rate only less than 2 times the volumes of the particles as such (standardized to 25° C. and atmospheric pressure).

The above-mentioned process parameters in combination with the residence time of the granulate 9 in the rotary kiln 1 and the helium atmosphere in the vitrification zone 13 have the effect that the open porosity is mainly disappearing. The surface is dense. The quartz glass particles 15 are evidently completely transparent upon removal in this method stage.

If agglomerates are arising, these will disintegrate again due to the mechanical stress in the moving loose granulate material 9 or by vibration of the rotary tube 6.

At the same time one can observe a uniform abrasion of $Al_2O_3$ from the mullite of the rotary kiln 6 which passes onto the surface of the granulate particles 9 and into the pores thereof. The vitrified quartz glass granules produced thereby show a homogeneous doping with $Al_2O_3$ of about 10 wt. ppm for that reason. Adhesions to the inner wall of the rotary tube 6 are mainly avoided.

The completely vitrified and homogeneously doped quartz glass granules have a density of more than 2.0 g/cm$^3$ and a BET surface area of less than 1 m$^2$/g, and they have a relatively low helium content—in consideration of the vitrification under helium. They are continuously removed via the discharge housing 11 and the outlet nozzle 17.

The quartz glass granules are used for producing the outer layer of a quartz glass crucible; the viscosity-enhancing action of the $Al_2O_3$ doping helps to prolong the service life of the quartz glass crucible.

The invention claimed is:

1. A method for producing synthetic quartz glass granules, said method comprising:
   vitrifying a free-flowing $SiO_2$ granulate of porous granulate particles, which is obtained by granulation of pyrogenically produced silicic acid, and
   said vitrifying the $SiO_2$ granulate taking place in a rotary kiln comprising a ceramic rotary tube containing mullite,
   said ceramic rotary tube being made by applying a starting powder containing $SiO_2$ and $Al_2O_3$ with a molar fraction of at least 70% to a mold core using a thermal powder spraying method so as to form a mullite-containing layer, and subsequently removing the mold core, and
   wherein, during the vitrifying of the $SiO_2$ granulate therein, the ceramic rotary tube is flooded or flushed with a treatment gas containing at least 30% by vol. of helium, hydrogen, or a mixture thereof.

2. The method according to claim 1, wherein the thermal powder spraying method used for producing the ceramic rotary tube is a plasma powder-spraying method.

3. The method according to claim 1, wherein the starting powder contains at least 75 mole % $Al_2O_3$, and wherein $SiO_2$ and $Al_2O_3$ are present in amounts that together constitute at least 95% by wt. of the ceramic rotary tube.

4. The method according to claim 1, wherein the ceramic rotary tube is of material that has an alkali content of less than 0.5% by wt.

5. The method according to claim 1, wherein at least part of the starting powder is synthetically produced.

6. The method according to claim 1, wherein the ceramic rotary tube is of a ceramic, mullite-containing material that has a density in the range of from 2.5 to 2.9 g/cm$^3$.

7. The method according to claim 1, wherein the ceramic rotary tube is of a ceramic, mullite-containing material that has an open porosity of less than 10% by vol.

8. The method according to claim 1, wherein the treatment gas contains at least 50% of helium, hydrogen or a mixture thereof.

9. The method according to claim 8, wherein the porous granulate particles are subjected to vibration.

10. The method according to claim 8, wherein the porous granulate particles are heated using a resistance heater surrounding the rotary tube.

11. The method according to claim 1, wherein the porous granulate particles are heated during vitrification to a temperature in the range of 1300° C. to 1600° C.

12. The method according to claim 1, wherein $Al_2O_3$ doping in the range of 1 to 15 wt. ppm is effected using the rotary tube.

13. The method according to claim 1, wherein the rotary tube consists completely of mullite-containing ceramic.

14. The method according to claim 1, wherein the porous granulate particles have a mean grain size between 100 μm and 2000 μm ($D_{50}$ value each time).

15. The method according to claim 1, wherein the porous granulate particles have a narrow particle size distribution with a value and a value each having a respective particle diameter associated therewith, wherein the particle diameter of the $D_{90}$ value is not more than twice as great as the particle diameter of the $D_{10}$ value.

16. The method according to claim 1, wherein the rotary tube is a rotary kiln, and prior to vitrification the $SiO_2$ granulate is subjected to purification by heating in a halogen-containing atmosphere, and wherein the $SiO_2$ granulate is purified in a second rotary kiln.

17. The method according to claim 16, wherein the second rotary kiln is used for drying and purifying the $SiO_2$ granulate and is subdivided into zones, including a drying zone and a cleaning zone, and wherein adjacent zones are subdivided by separating screens provided with openings or by labyrinth traps.

18. The method according to claim 1, wherein the starting powder contains at least 75 mole % $Al_2O_3$, and wherein the contents of $SiO_2$ and $Al_2O_3$ together account for at least 98% by wt. of the ceramic rotary tube.

19. The method according to claim 1, wherein the ceramic rotary tube is of a ceramic mullite-containing material that has an alkali content of less than 0.1% by wt.

20. The method according to claim 1, wherein the ceramic rotary tube is of a ceramic mullite-containing material that has an open porosity of less than 5% by vol.

21. The method according to claim 1, wherein the treatment gas contains at least 95% of helium, hydrogen, or a mixture thereof.

22. The method according to claim 1, wherein the porous granulate particles have a mean grain size between 200 μm and 400 μm ($D_{50}$ value each time).

* * * * *